(12) United States Patent
Djouider et al.

(10) Patent No.: US 7,750,317 B2
(45) Date of Patent: Jul. 6, 2010

(54) IONIZING RADIATIONS

(76) Inventors: Fathi Djouider, King Abdulazis University, P.O. Box 80204 - Nuclear Eng. Department, Jeddah 21589 (SA); Mohammed Aljohani, King Abdulazis University, P.O. Box 80204 - Nuclear Engineering Department, Jeddah 21589 (SA)

(*) Notice: Subject to any disclaimer, the term of this patent is extended or adjusted under 35 U.S.C. 154(b) by 311 days.

(21) Appl. No.: 12/069,630

(22) Filed: Feb. 11, 2008

(65) Prior Publication Data

US 2008/0285038 A1      Nov. 20, 2008

(51) Int. Cl.
G01N 21/00        (2006.01)
(52) U.S. Cl. .................................. 250/474.1
(58) Field of Classification Search ............ 250/370.07, 250/474.1, 484.5
See application file for complete search history.

(56) References Cited

U.S. PATENT DOCUMENTS

| | | | | |
|---|---|---|---|---|
| 3,031,575 A | * | 4/1962 | Gevantman et al. | 250/474.1 |
| 4,130,760 A | * | 12/1978 | Fanselow et al. | 250/474.1 |
| 4,143,274 A | * | 3/1979 | Apfel | 250/473.1 |
| 5,120,969 A | * | 6/1992 | Kronenberg | 250/474.1 |
| 5,430,308 A | * | 7/1995 | Feichtner et al. | 250/475.2 |
| 5,511,107 A | * | 4/1996 | Sliski | 378/207 |
| 5,905,263 A | * | 5/1999 | Nishizawa et al. | 250/367 |
| 6,066,851 A | * | 5/2000 | Madono et al. | 250/367 |
| 2005/0208290 A1 | * | 9/2005 | Patel | 250/305 |
| 2006/0027756 A1 | * | 2/2006 | Thomson et al. | 250/370.07 |
| 2007/0246657 A1 | * | 10/2007 | Lewis | 250/370.07 |
| 2008/0277572 A1 | * | 11/2008 | Djouider et al. | 250/395 |

* cited by examiner

*Primary Examiner*—Kara E Geisel
(74) *Attorney, Agent, or Firm*—Melvin I. Stoltz

(57) ABSTRACT

A method of determining the radiation doses to which specific locations are subjected is provided. The method comprises providing an assembly comprising a plurality of layers, each of which includes a number of regularly spaced individual compartments that contain a liquid that changes in color when exposed to radiation, radiating the assembly, determining the changes in optical density of the liquid in the individual compartments and calculating the doses of radiation to which the compartments have been subjected from the changes in optical density.

5 Claims, 1 Drawing Sheet

Figure not drawn to scale

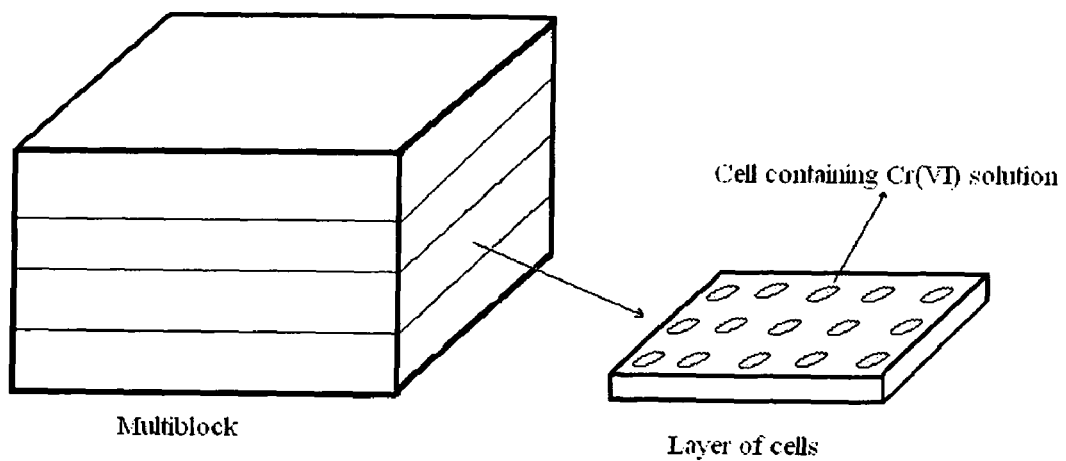
Figure not drawn to scale

IONIZING RADIATIONS

FIELD OF THE INVENTION

This invention relates to ionizing radiations.

Ionizing radiations are used, in particular, to cure cancer, i.e. by radiotherapy. The ionizing radiations have sufficient energy to break chemical bonds and separate electrons from their parent atoms and molecules in cancer cells, particularly in the nucleus containing DNA. The ultimate damage to the DNA leads to the death of the cancer cells.

However, gamma rays, alpha particles and beta particles used for medical purposes can be dangerous in that they can induce potential cancer when healthy cells around a cancer tumour are irradiated. In addition, X-rays which are used to medical imaging, for example, inspecting broken legs, can also induce potential cancer if a patient is over-exposed.

The absorbed dose of radiation is the amount of energy given to the medium, for example, a human exposed to radiation, per unit mass. It is normally measured in gray (Gy) defined as Joules/kg. Measurement of the absorbed dose due to radiation is the task of radiation dosimetry.

A number of different instruments have been used to measure the absorbed dose and are based on the detection of the physical or chemical changes caused by the radiation. For example, ionisation chambers measure the electrical charge produced by ionization of a gas inside a device called a detector. The measuring instruments typically provide an indirect determination of the dose.

Radiation dosimetry is needed in many areas, particularly in respect of cancer treatment using radiotherapy and in clinical diagnostic radiology.

As mentioned above, radiation therapy works by damaging the DNA of cancer cells causing them to die. Although normal cells are also sometimes damaged by the radiotherapy, healthy cells have the ability to repair themselves when subject to limited amounts of damage, while diseased cells are destroyed. External radiotherapy uses high energy rays (X-ray or gamma rays) or particle beams (protons or electrons) that are directed at the tumour to be treated, normally from several angles. Radiotherapy is normally given as a course of treatment spread over a number of days or weeks so as to allow the healthy cells around the tumour to recover from any damage that they may suffer.

It is, of course, important to ensure that the healthy cells are not subject to excessive damage.

It is accordingly an object of the present invention to provide a method of determining the radiation doses to which specific locations are subjected when a radiotherapy treatment procedure is carried out.

SUMMARY OF THE INVENTION

According to the present invention there is provided a method of determining the radiation doses to which specific locations are subjected, the method comprising providing an assembly comprising a plurality of layers, each of which includes a number of regularly spaced individual compartments that contain a liquid that changes in colour when exposed to radiation, radiating the assembly, determining the changes in optical density of the liquid in the individual compartments and calculating the doses of radiation to which the compartments have been subjected from the changes in optical density.

The liquid in the compartments preferably comprises an aqueous solution of a chromate, which may be saturated with nitrous oxide. The aqueous solution may also contain a formate.

The various layers forming the assembly are preferably formed of polymethylmethacrylate.

BRIEF DESCRIPTION OF THE DRAWINGS

The single FIGURE of the accompanying drawings illustrates schematically the method of the present invention.

DESCRIPTION OF THE PREFERRED EMBODIMENT

The assembly shown in the drawings comprises a number of layers of a material that has properties equivalent to those of human tissue, in terms of reaction to radiation. A suitable material is polymethylmethacrylate having a Specific Gravity of 1.19. The dimensions of the assembly are typically of the order of 50×40×30 cm.

Although the assembly shown in the drawings has only four layers, in practice there will be a much larger number of layers, for example, something of the order of thirty layers. Each layer comprises a number of blocks each formed with a compartment having a volume of the order of 1 $cm^3$ and, although the drawings show a layer comprising 3×5 blocks, each layer will typically contain 30×40 blocks.

The compartments are filled with a chemical dosimeter solution, with the compartments in each layer being filled up one by one and then the filled layers are placed one on top of each other until the complete assembly is ready for radiation. The complete assembly is then placed on a table in a position in which a patient would be located when receiving a radiotherapy treatment and the complete assembly is then irradiated.

The chemical dosimeter solution with which the compartments are filled consists of a nitrous-oxide-saturated solution at pH 9.2 containing:

a) $10^{-3}$ mol/dm of potassium chromate, and b) $10^{-2}$ mol/dm of sodium formate.

When this solution absorbs radiation energy, for example, gamma or X-rays, or a beam of electrons or protons, the chromate solutions changes from a yellow colour to a greenish blue colour. The amount of chromate ion conversion is directly proportional to the amount of energy absorbed, i.e. to the total dose of radiation. The bleaching or disappearance of the chromate ions is determined spectrophotometrically, the maximum absorption wavelength of this ion being 370 nm. The degree of bleaching increases linearly with doses from 0.1 kGy to at least 10 kGy and is independent of dose rate up to 70 kGy/min.

Once the change in optical density (CIOD) has been determined by the measurements obtained using the spectrophotometer, the dose of radiation that has been received in each compartment can be calculated using the formula:

$$\text{Dose} = 1.04 \times 10^3 \times (\text{CIOD}).$$

A chart can then be produced showing the distribution of the radiation dosage. It is thus possible to assess whether, for a planned radiation treatment programme, the dose of radiation received in any of the compartments is above prescribed guidelines. The possibility of subjecting a patient to excessive doses of radiation can thus be reduced.

The present invention thus provides benchmarks for the quality assurance and safety control of current radiotherapy procedures.

The invention claimed is:

1. A method of determining the radiation doses to which specific locations are subjected, the method comprising providing an assembly comprising a plurality of layers, each of which includes a number of regularly spaced individual compartments that contain a liquid that changes in colour when exposed to radiation, radiating the assembly, determining the changes in optical density of the liquid in the individual compartments and calculating the doses of radiation to which the compartments have been subjected from the changes in optical density.

2. A method as claimed in claim 1, in which the liquid in the compartments comprises an aqueous solution of a chromate.

3. A method as claimed in claim 2, in which the aqueous solution is saturated with nitrous oxide.

4. A method as claimed in claim 2, in which the aqueous solution also contains a formate.

5. A method as claimed in claim 1, in which the assembly is formed of polymethylmethacrylate.

* * * * *

UNITED STATES PATENT AND TRADEMARK OFFICE
CERTIFICATE OF CORRECTION

PATENT NO. : 7,750,317 B2
APPLICATION NO. : 12/069630
DATED : July 6, 2010
INVENTOR(S) : Djouider et al.

It is certified that error appears in the above-identified patent and that said Letters Patent is hereby corrected as shown below:

On the Title Page, Item (76)

Please amend inventor Fathi Djouider's address by removing "King Abdulazis University" and replacing it with --King Abdulaziz University--.

Please amend inventor Mohammed Aljohani's address by removing "King Abdulazis University" and replacing it with --King Abdulaziz University--.

Signed and Sealed this
Thirteenth Day of December, 2011

David J. Kappos
*Director of the United States Patent and Trademark Office*